United States Patent [19]

Cook et al.

[11] Patent Number: 5,283,899

[45] Date of Patent: Feb. 1, 1994

[54] FIRST-IN/FIRST-OUT BUFFER QUEUE MANAGEMENT FOR MULTIPLE PROCESSES

[75] Inventors: John A. Cook; Gregory A. Flurry; Larry W. Henson, all of Austin, Tex.

[73] Assignee: International Business Machines Corporation, Armonk, N.Y.

[21] Appl. No.: 982,251

[22] Filed: Nov. 25, 1992

Related U.S. Application Data

[63] Continuation of Ser. No. 480,181, Feb. 13, 1990.

[51] Int. Cl.$^5$ .............................................. G06F 9/46
[52] U.S. Cl. .............................. 395/650; 364/DIG. 1; 364/239; 364/239.4; 364/238.9; 364/230.3; 364/244.3; 364/281.3
[58] Field of Search ................ 395/325, 275, 800, 650

[56] References Cited

U.S. PATENT DOCUMENTS

| | | | |
|---|---|---|---|
| 4,363,093 | 12/1982 | Davis | 395/200 |
| 4,494,192 | 1/1985 | Lew | 395/325 |
| 4,564,901 | 1/1986 | Tomlinson et al. | 395/650 |
| 4,571,671 | 2/1986 | Burns | 395/250 |
| 4,800,521 | 1/1989 | Carter et al. | 395/650 |
| 4,847,755 | 7/1989 | Morrison | 395/800 |
| 4,949,280 | 8/1990 | Littlefield | 395/163 |
| 4,987,529 | 1/1991 | Craft | 395/325 |
| 4,998,198 | 3/1991 | Chan | 395/275 |

OTHER PUBLICATIONS

IBM TDB, "I/O Channel and Device Controller with Early Chaining", vol. 25, No. 5, Oct. 1982, pp. 2392-2393.

IBM TDB, "Device Queue Management", vol. 31, No. 10, Mar. 1989, pp. 45-50.

8167 Computer Design, vol. 18, No. 4, Apr. 1979, "Designing a Microprocessor Driven Multipurpose Peripheral Controller", Richard F. Binder, pp. 83-91.

Computer Graphics, vol. 22, No. 4, Aug., 1988, entitled "Virtual Graphics" by Voorhees, Kirk and Lathrop, pp. 247-253.

Primary Examiner—Debra A. Chun
Attorney, Agent, or Firm—Thomas E. Tyson; Mark E. McBurney

[57] ABSTRACT

A data processing system that includes several ongoing processes that provide input words to a buffer of an independently executing processor, a buffer manager that controls the process access to the buffer and controls the words input by the processes to the buffer that includes an apparatus for regulating the number of words from an executing first process for loading into the buffer, an apparatus for loading the number of words, an apparatus for loading a synchronization word when a second process is to be executed and an apparatus for halting the loading of the first process words and providing for loading of the second process words when the synchronization word is accessed by the independently executing processor.

20 Claims, 8 Drawing Sheets

FIRST-IN/FIRST-OUT BUFFER QUEUE MANAGEMENT FOR MULTIPLE PROCESSES

This is a continuation of application Ser. No. 07/480,181 filed Feb. 13, 1990.

RELATED PATENT APPLICATIONS

This patent application is related to copending Patent Application Ser. No. 07/480,186, filed Feb. 13, 1990 entitled "Rendering Context Manager for Display Adapters"; Patent Application Ser. No. 07/480,182, filed Feb. 13, 1990, entitled "Display Adapter Event Handler With Rendering Context Manager"; Patent Application Ser. No. 07/480,183, filed Feb. 13, 1990 entitled "Rendering Context Manager for Display Adapters Supporting Multiple Domains"; and Patent Application Ser. No. 07/480,187, filed Feb. 13, 1990 entitled "Improved Locking Semantics in a Rendering Context Manager".

TECHNICAL FIELD

This invention relates to data processing and, more specifically, to a buffer manager used in a data processing system.

BACKGROUND ART

In data processing systems, the management of buffer queues is required in many areas. For instance, commands stored for an independently executing processing system will be temporarily stored in buffer queues. Therefore, the supplier of the commands need not provide the commands synchronized with the execution of commands by the independent processing device. However, it must be ensured that the buffer storing these commands temporarily does not overflow or, in a system optimally providing commands, that the buffer queue does not become empty. Traditionally, two techniques have been used to manage buffers. One technique requires that the sender of commands to the buffer query the status of the buffer. In a data processing system where the buffer is tightly coupled to the remainder of the system, this may not be a problem. However, if the buffer is located on a communications bus, the querying of status includes a bus overhead. A second technique is to fill the buffer and wait for the buffer to empty before it is filled again.

One example of an embodiment using the full buffer technique is contained in a paper entitled "Virtual Graphics" by Voorhies, Kirk and Lathrop, published in *Computer Graphics*, Vol. 22, No. 4, August, 1988. This reference illustrates a first-in/first-out (FIFO) buffer that provides interrupts when the buffer is nearly full by providing an interrupt each time a command is presented to the buffer. This forces the process providing these commands to wait until the buffer is only half full. While this process does regulate the number of commands placed into the buffer, it also generates an excessive number of interrupts.

It is the object of the present invention to provide a buffer manager that minimizes the number of interrupts required while optimally providing entries to the buffer.

DISCLOSURE OF THE INVENTION

In accordance with the present invention, a data processing system is provided that includes a plurality of processes. A buffer manager is provided for controlling the process access and controlling words input by an executing one of the processes to a buffer of an independently executing processor. This buffer manager includes an apparatus for regulating a number of words from an executing first process for loading into the buffer, an apparatus for loading the number of words, an apparatus for loading a synchronization word when a second process is to be executed and an apparatus for halting the loading of the first process words and providing for the loading of the second process words when the synchronization word is accessed by the independently executing processor.

Also in accordance with the present invention, a method for performing buffer management is provided in a data processing system that includes several processes and a buffer contained in an independently executing processor. The method includes the steps of (1) regulating the number of words from an executing first process for loading into the buffer, (2) loading the number of words, (3) loading a synchronization word when a second process is to be executed, and (4) halting the loading of the first process words and providing for the loading of the second process words when the synchronization word is accessed by the independently executing processor.

BRIEF DESCRIPTION OF THE DRAWING

The foregoing and other objects, aspects and advantages of the invention will be better understood from the following Best Mode for Carrying Out the Invention with reference to the figures listed below, in which.

BEST MODE FOR CARRYING OUT THE INVENTION

This invention provides the ability for multiple processes executing in a system processor to access a single display adapter to display information on a graphics display. The invention makes it possible for these multiple application modules to coexist in a manner where each module operates independently of the other applications modules even though they are all sharing the single graphics adapter.

Figure 1:
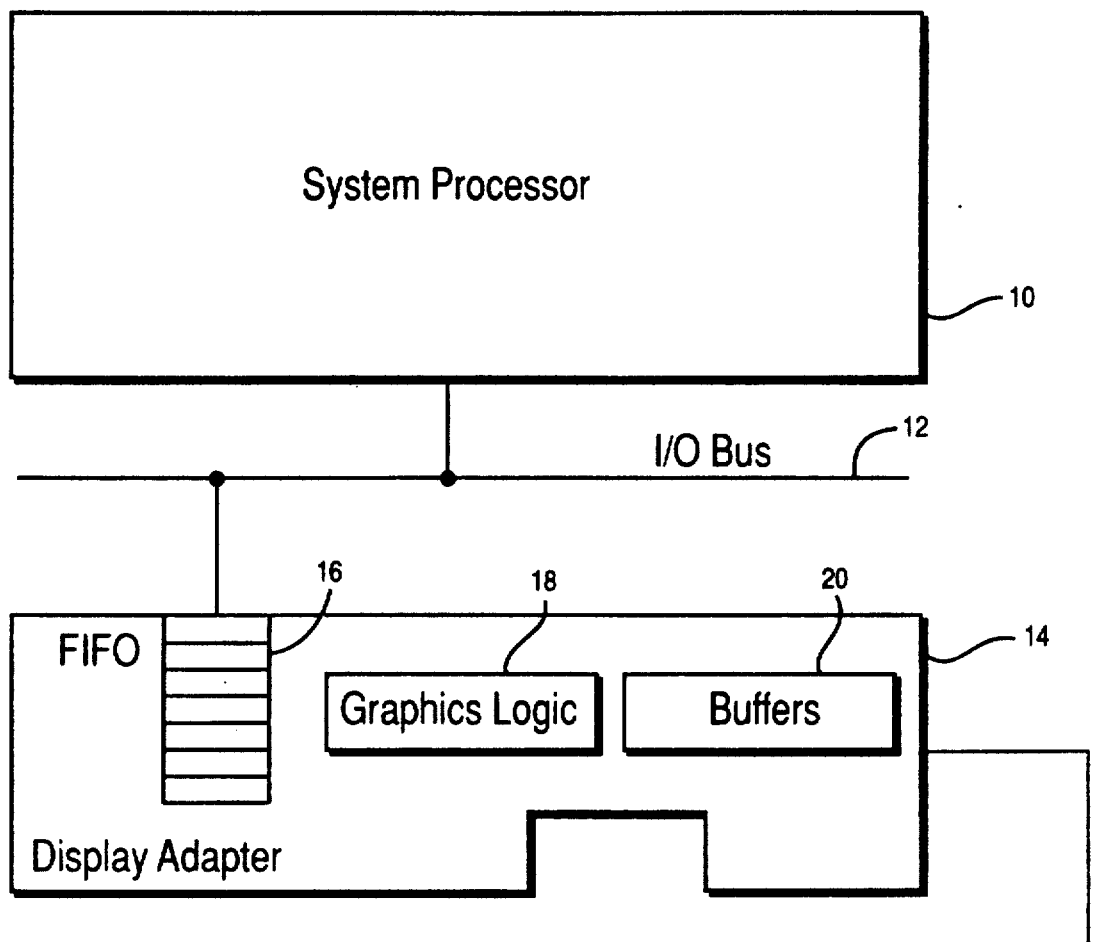
FIG. 1 is a block diagram of a computer system with a graphics display.

FIG. 1 is a block diagram of the system illustrating the system processor 10 connected to an input/output bus 12. The input/output bus 12 is further connected to a display adapter 14. The display adapter is connected to a graphics display 22. The display adapter 14 further includes a command list first-in/first-out buffer 16, graphics logic 18 and a display buffer 20. Commands contained in the buffer queue 16 are executed in the graphics logic 18 and provide display data to the buffer 20 for display on the graphics display 22. The operation of the graphics adapter 14 is known in the art. The invention relates to the management of the command queue 16 by multiple processes in the system processor 10. Therefore, this invention can be used with any display adapter that has a single first-in/first-out command queue such as queue 16 in FIG. 1. One such display adapter is the IBM High Performance 24-Bit 3D Graphics Processor.

Figure 2:
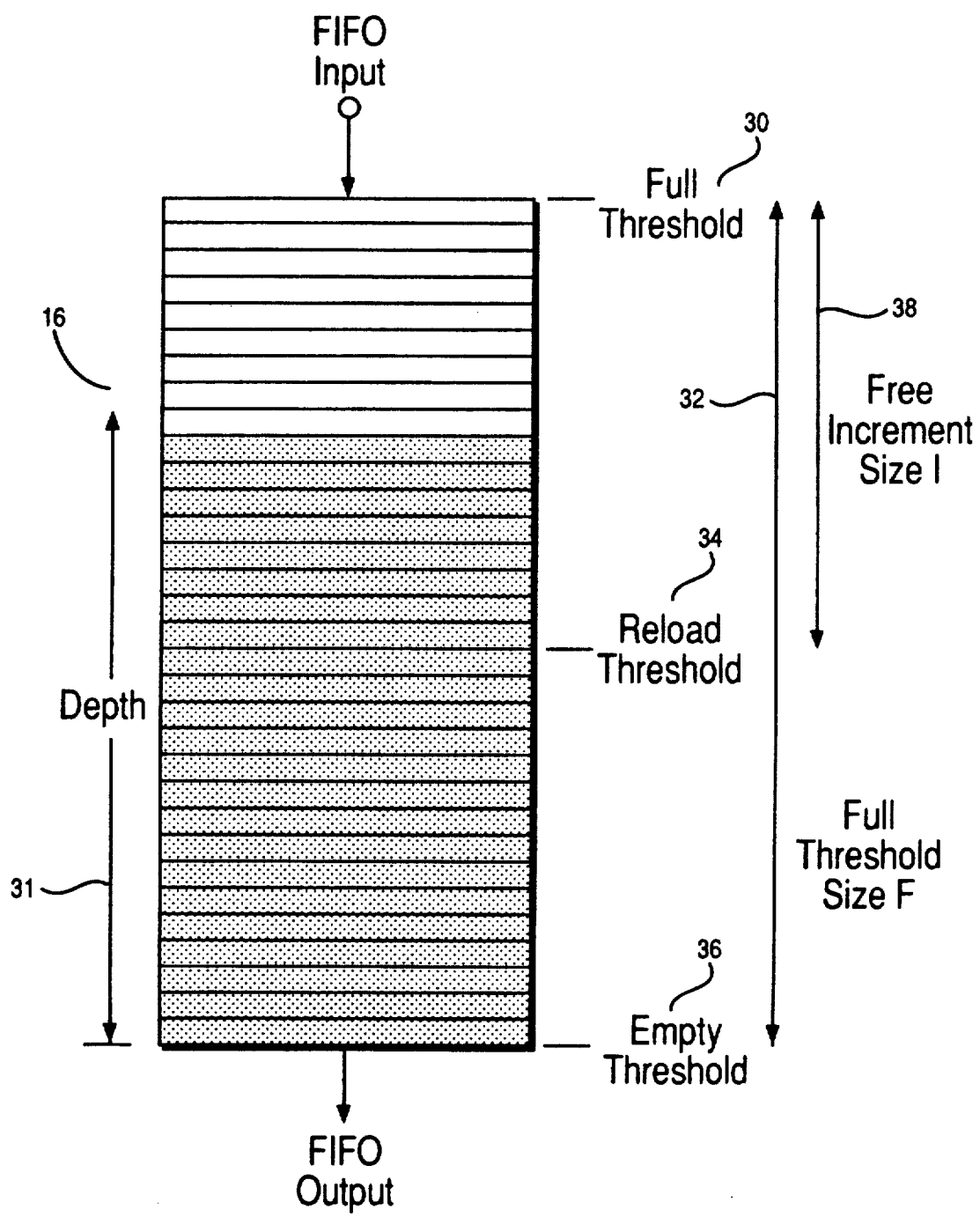
FIG. 2 is a symbolic diagram of a first-in/first-out buffer.

A symbolic diagram of the first-in/first-out command queue buffer 16 is illustrated in FIG. 2. This queue 16 includes multiple locations for storing commands. The command threshold size is illustrated by arrow 38. In the preferred embodiment, midway in the queue 16, a location is designated as the reload threshold 34. At this point, in the preferred embodiment, the queue 16 would be half full if all locations above the threshold 34 are empty. The number of these locations is the free increment size represented by the arrow 32. When the command queue 16 is completely filled, all of the locations from the bottom up to the full threshold 30 are occupied. As the commands are accessed on a first-in/first-out basis, the locations starting at the bottom location are emptied. When the reload threshold location 34 has been emptied, an interrupt is raised in the preferred embodiment. Furthermore, in the preferred embodiment, when the last command at the empty threshold location 36 has been executed, an empty threshold interrupt is provided. These two interrupts, the reload threshold interrupt and the empty threshold interrupt, are the only hardware signals required by the graphics adapter 14 (FIG. 1) by this invention.

Figure 3:
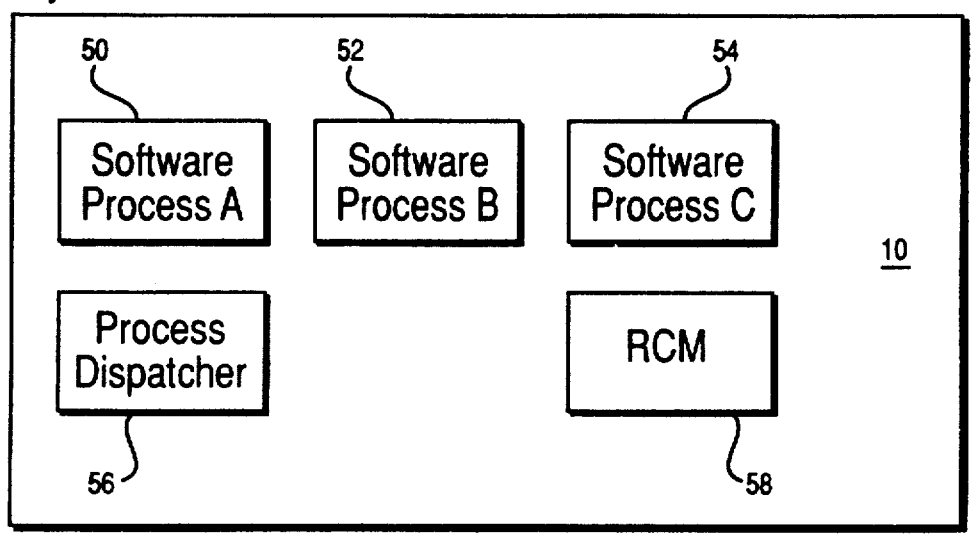
FIG. 3 is a block diagram of the system processor illustrating the software modules contained therein.

FIG. 3 is a block diagram of the system processor 10 illustrating the software modules contained for execution. These software modules consist of applications software processes A 50. B 52 and C 53. These are software application routines that are being run internally in the system processor that, according to this embodiment, require access to the graphics display to provide output information to the operator. In this invention, each of the processes 50. 52 and 54 are treated as independently executing processes. In other words, each process 50. 52 and 54 is executed independently of the existence of the other processes. Each process thinks that it is the only process that is accessing the graphics adapter. Therefore, these processes. 50. 52 and 54, do not address the problems associated with the management of the graphics adapter by multiple processes. The process dispatcher 56 is provided to manage the execution of the application processes 50, 52 and 54 in the system processor 10. Process dispatcher 56 determines which of the application processes 50. 52 and 54 are to be executed at any time within the system processor 10. The rendering context manager 58 manages the access of each of the application processes 50. 52 and 54 to the graphics adapter 14. Operation of the rendering context manager 58 provides for the independent operations of the application processes 50. 52 and 54.

Figure 4:
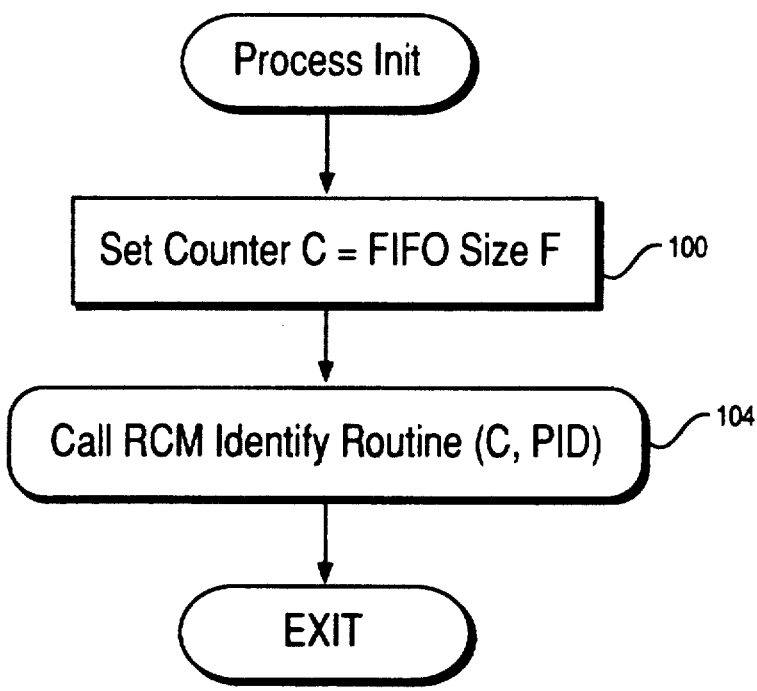
FIG. 4 is a flow chart of the initialization routine for an applications process.

In FIG. 4, a flow chart illustrating the initialization routine for the application processes (such as processes 50. 52 and 54 in FIG. 3) is illustrated. In step 100, a counter, used by the application when writing to the display adapter 14, is set to the full threshold size of the first-in/first-out command queue 16 (FIG. 2). Lastly, in step 104, the address of the counter C is provided to the rendering context manager module 58 (FIG. 3).

Figure 5:
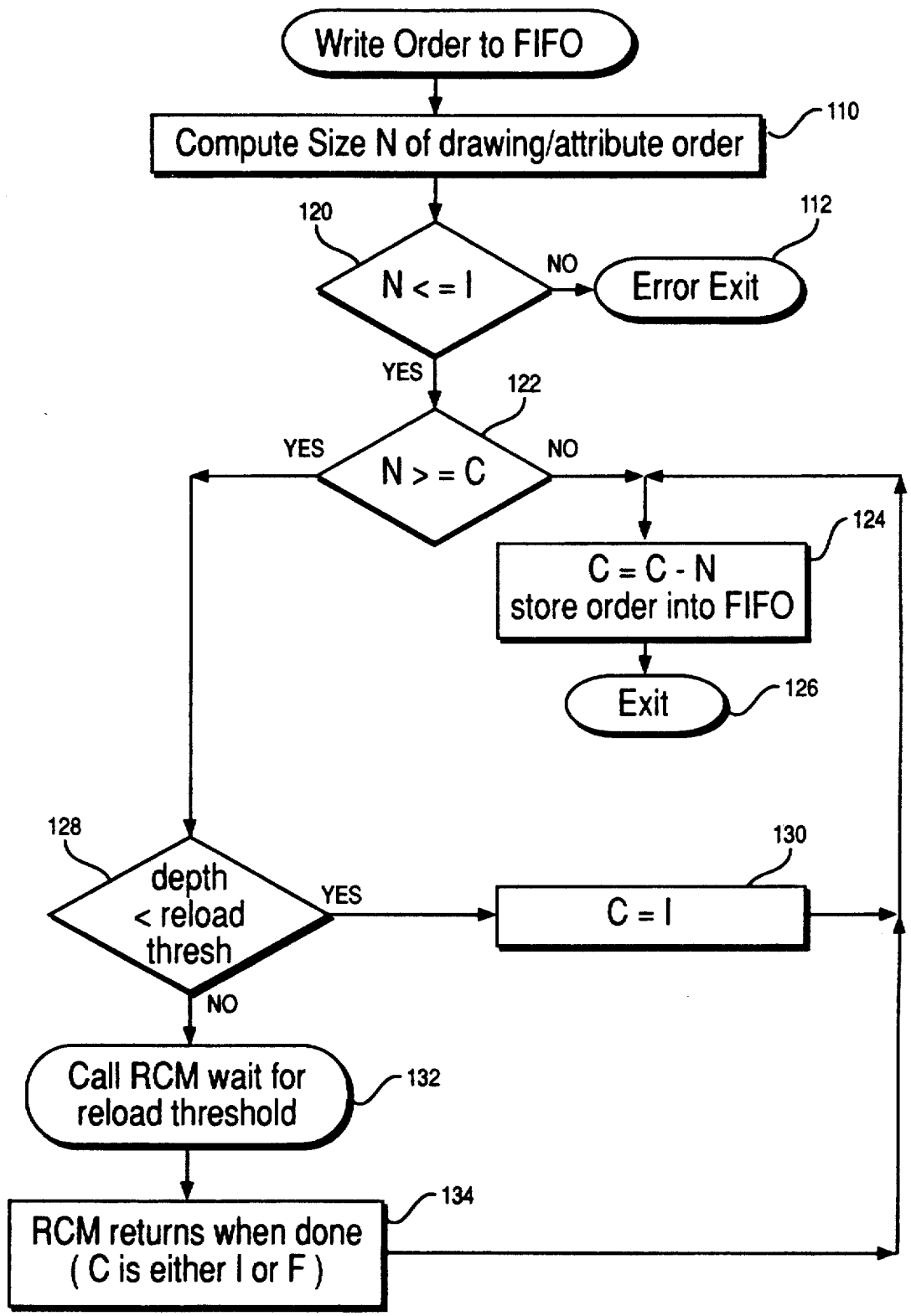
FIG. 5 is a flow chart for the applications process graphics module.

FIG. 5 is a flow chart illustrating the graphics module that is contained in the application processes 50. 52 and 54 (FIG. 3). In step 110, the process first computes the size N of a task for providing a drawing or attribute order. A drawing order is a command which causes an object to become visible on the graphics display 22 (FIG. 1). An attribute order sets up conditions under which the drawing orders are executed; for example, an order to change the color of all lines to be drawn is an attribute order. The distinction between the two categories is not important for the purposes of this invention; rather, the importance is that all commands are processed via the first-in/first-out command queue.

In step 120, the size of the order is compared to the the free increment size (I). The free increment size is equivalent to the number of locations illustrated by arrow 32 in FIG. 2. This is the number of locations between the full threshold 30 and the reload threshold 34 locations in the queue 16. The independent operation of multiple processes 50. 52, 54 under the method of the invention depends upon the replacement of C by the value I in step 130 of FIG. 5. Therefore, no order can have a size which exceed the value I. It is not anticipated that users of the graphics subsystem will generate the error exit of step 112.

In step 122, the value N is then compared to the stored value of C. which is the counter used by the application in FIGS. 4 and 5. If the value N is less than the value of C. the implication is that insufficient capacity in the buffer exists to add N more words. Thus, the process proceeds to step 128 to check the first-in/first-out buffer 16 status of reload threshold. This step begins the synchronization of the software counter C with the hardware queue status. In step 128, if the queue depth is below the reload threshold, then process proceeds to step 130 to replace C with the value I. A replacement is shown in the flowchart, because there are at least I locations free in the buffer, and because a replace is non-interruptible in the best mode of the invention. However, if the system processor permits other non-interruptible operations with very low overhead, the addition of C+I could be substituted for the value of I. The process then continues to step 124 to provide the commands to the queue 16.

Returning to step 128, if the process has determined that the queue 16 is not below the reload threshold, the process proceeds to step 132 which accesses the rendering context manager module 58, which effectively places the applications module in a wait or sleep state. Actually, the process dispatch module 56 stops the application's process and proceeds to another application's process while the rendering context manager 58 waits for the queue 16 to drop below the reload threshold. The application does not issue a request to sleep; instead, it calls a routine within the kernel process, the rendering context manager 58, which manages the sleep process. In step 134, when the hardware condition has been met, i.e., the threshold has been crossed, an interrupt is received by the rendering context manager 58. The rendering context manager 58, knowing the state of the display adapter, overwrites the value of C with the known size of available locations. The rendering context manager 58 then provides an indication to the process dispatcher 56 to activate the application process, which then proceeds to step 124 to provide the write commands to the queue 16.

Figure 6:
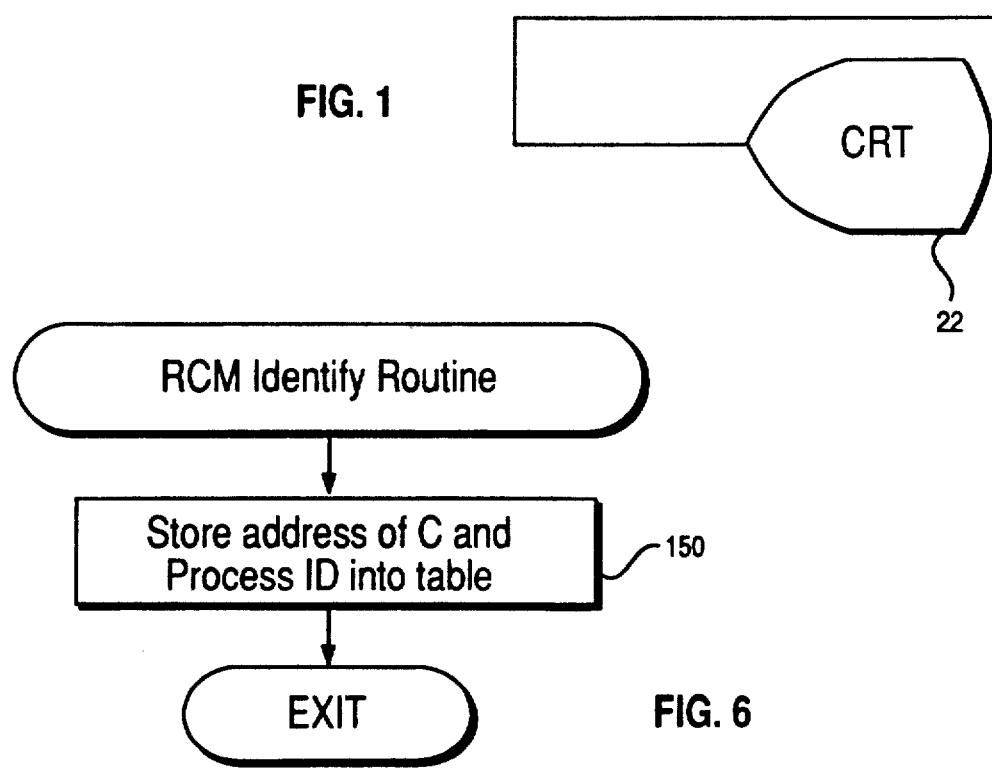
FIG. 6 is a flow chart of an initialization routine for the rendering context manager software module.

FIG. 6 is a flow chart illustrating the single step, step 150, in the initialization routine for the rendering context manager 58. In step 150, the address of counter C is stored together with the software process I.D. into a table. This table includes the critical numbers F and I (queue size and reload threshold increment size).

Figure 7:
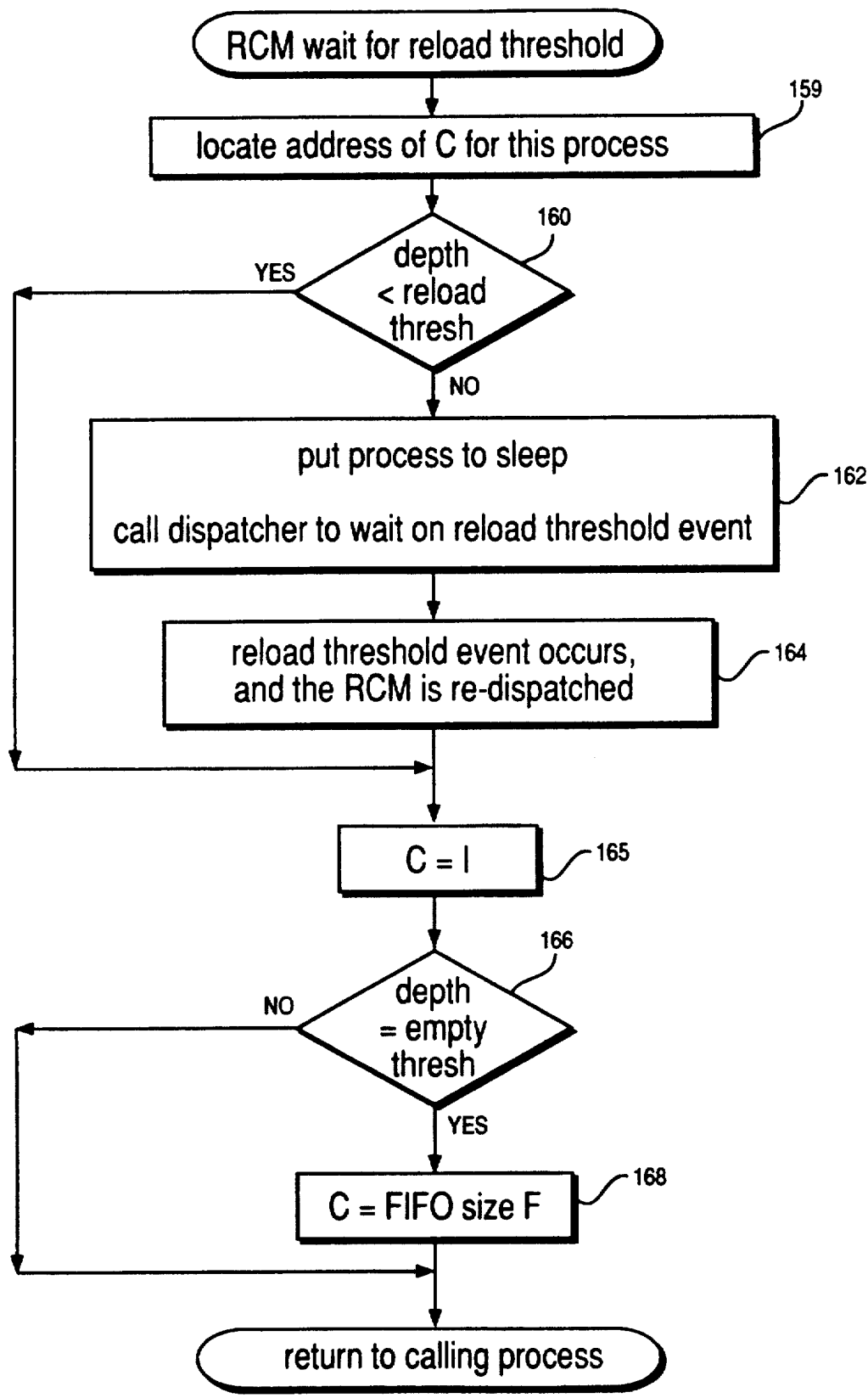
FIG. 7 is a flow chart illustrating the graphics adapter monitoring routine of the rendering context manager process.

In FIG. 7, the rendering context manager module that monitors the threshold interrupt is illustrated. In step 159, the rendering context manager looks up the address of counter C for the process which has called the rendering context manager. In step 160, the rendering context manager checks the status of the queue 16 reload threshold. In this step, a determination is made as to whether the queue 16 is below the reload threshold. This is done in advance of waiting on the interrupt, as an optimization of performance. If so, the process proceeds to step 165. If not, the process proceeds to step 162 to put the current process in a wait or sleep state by calling the process dispatcher 56. When the threshold interrupt is received the process dispatcher 56 reactives the application process which had made the kernek subroutine call to the rendering context manager 58. Program execution resumes in the rendering context manager 58 at step 164, which then continues. Proceeding to step 165, the rendering context manager then replaces the content of C from its graphics adapter table with the parameter I. A replacement is shown in the flowchart, because there are at least I locations free in the buffer, and because a replace is non-interruptible in the best mode of the invention. However, if the system processor permits other non-interruptible operations with very low overhead, the addition of C+I could be substituted for the value of I.

In step 166, a test is made as to whether the queue 16 has reached the empty status. This test is another optimization to performance. In a preemptible system, such as is used on the best embodiment, many other activities could have taken place in the system between steps 162 and 164. Therefore, a significant increase in the value C is possible (from I to F) at the cost of one additional test of the hardware. If the queue is empty the full value F of the queue is used to replace C in step 168. The process then exits this routine. Control is returned to the application process, which was at step 132 of FIG. 5 and which resumes at step 134 in FIG. 5.

Figure 8:
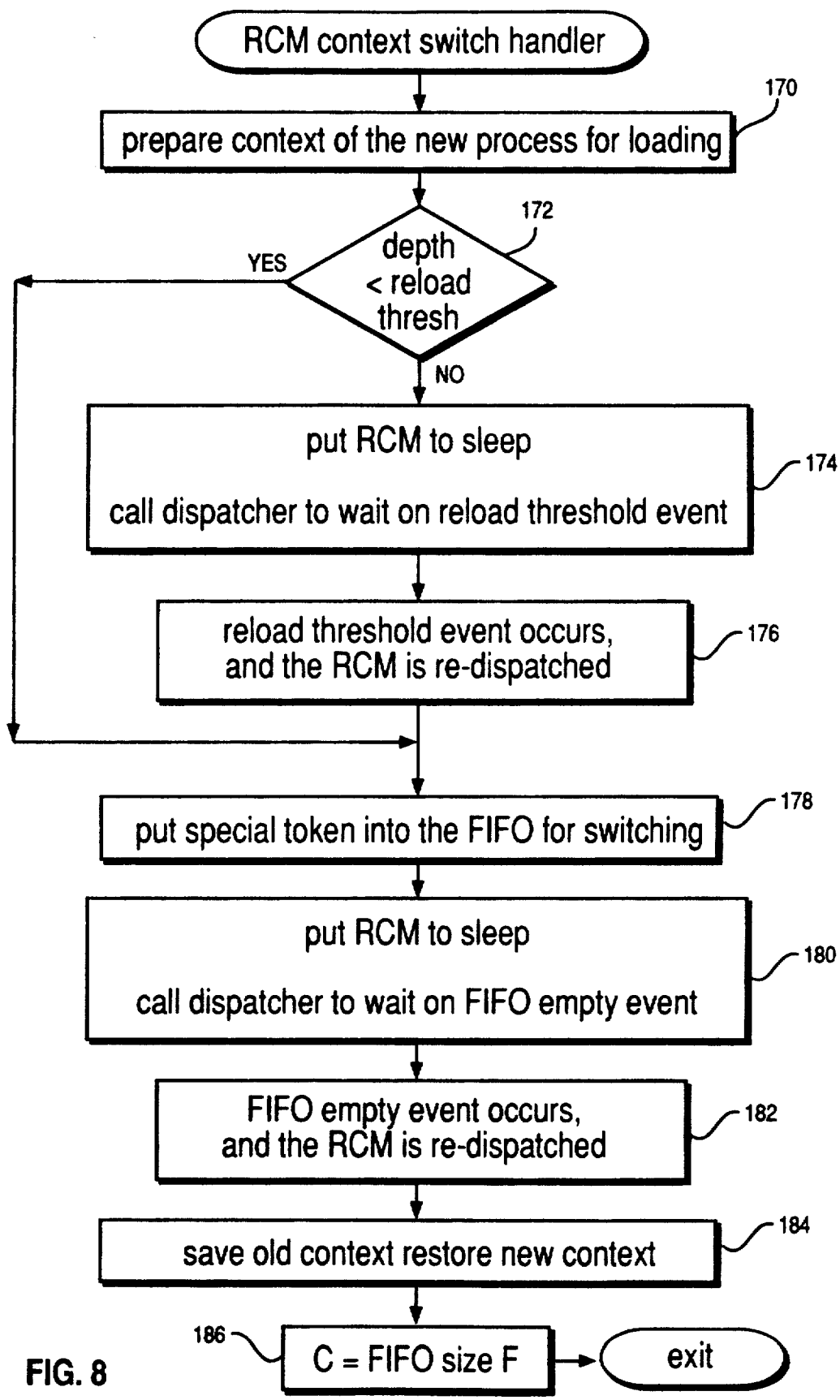
FIG. 8 is a flow chart of the context switch handler of the rendering context manager process module.

In FIG. 8, the rendering context manager module that provides for context switching is illustrated in a flow chart. Context switching is the ability of one process to access the display adapter after another process has accessed the display adapter. Since only one process is active in the system processor 10 it would seem that only one active applications module could access the display adapter 14. However, since the display adapter 14 includes the command queue 16, it is possible for an applications process such as applications process 50 to provide many commands to the command queue 16 and then be deactivated (or put to sleep) while a second applications process 52 is activated. The rendering context manager software provides for the second process 52 to also access the display adapter 14 in a manner that is independent of the previous access by the applications process 50. In other words, the new applications process 52 is not concerned with what commands exist on the command queue 16 in the display adapter 14. In FIG. 8, in step 170, the rendering context manager prepares the new process context for loading. This means that the elements of that applications processes, context (access to the graphics adapter) are provided to the graphics adapter. Examples of context include the set of colors used to draw objects, the set of matrices used to map coordinates, or the definition of the active region in use in a windowing system.

In step 172, the process determines if the queue 16 is below the reload threshold. If so, the process proceeds to step 178. If not, the process proceeds to step 174 where the rendering context manager 58 is put in a wait state until the threshold interrupt is received. The rendering context manager must wait until the queue 16 drops below the reload threshold in order to place the synchronization token onto the command queue. In step 176 when the threshold interrupt is received, the rendering context manager is reactivated. The rendering context manager process then proceeds to step 178 to place a synchronization token on the queue 16. The synchronization token indicates that a new command list is to be loaded for a new applications process. In step 180, the rendering context manager goes into a wait state waiting for a posting to indicate required service from the display adapter 14. Then upon the occurrence of some posting such as the empty interrupt a timer interrupt (indicating the error condition) or the desired posting that the synchronization token has been read from the queue 16 and processed by the graphics logic 18, the rendering context manager is reactivated in step 182. In step 184, the old context (the context data for the applications process that is being removed from the display adapter 14) is stored and the new context is provided to the display adapter 14. In step 186, the contents of counter C of the new process, associated with the newly loaded context, is replaced with the value F, the full threshold size. The module is then exited.

Figure 9:
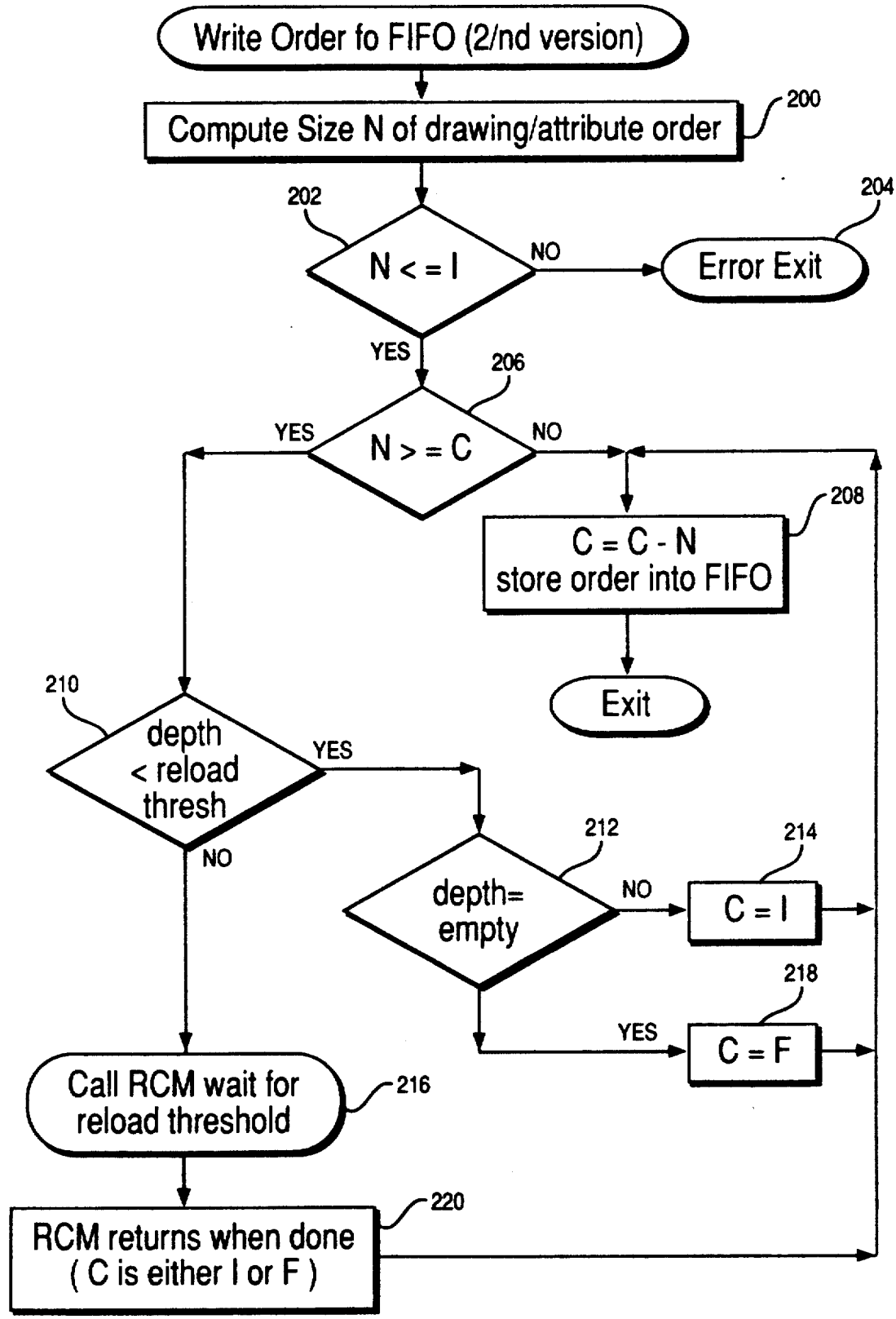
FIG. 9 is a flow chart illustrating a second embodiment of the application process graphics module.

FIG. 9 is a flow chart of a second embodiment of the graphics process module that regulates the number of commands written into the buffer. In FIG. 9, in step 200, the process computes the number of commands N to be drawn. In step 202, a decision is made as to whether N is less than or equal to I. where I is the reload increment defined previously. If N is greater than I, an error condition has occurred and the program exits in step 204. If N is less than or equal to I. the process proceeds to step 206 to determine if N is less than C. where C is the count for that process. If the answer is yes, then the process proceeds to step 210 to determine if the depth of the buffer is less than the reload threshold level. If yes, in step 212 it is determined whether the depth is empty. In other words, it is determined whether the buffer is empty. If so, the process proceeds to step 218 where the counter is set to F, the total number of commands for the buffer. If the depth is not equal to empty, the process proceeds to step 214 to set the count equal to I. which is the number of commands when the buffer is full minus the number of threshold commands. A replacement is shown in the flowchart, because there are at least 1 locations free in the buffer, and because a replacement is non-interruptible in the best mode of the invention. However, if the system processor permits other non-interruptible operations with very low overhead, the addition of C+I could be substituted for the value of I for step 214.

Returning to step 210, if the depth is not less than the reload threshold, the rendering context manager program is called and the graphics process is placed in a wait state until the reload threshold interrupt has been received. Then, in step 220, after this reload threshold interrupt has been received, the rendering context manager returns the graphics process to an active status and proceeds to step 208. In step 208, the counter is recomputed to be the count minus the N commands being loaded and the module is exited.

Figure 10:
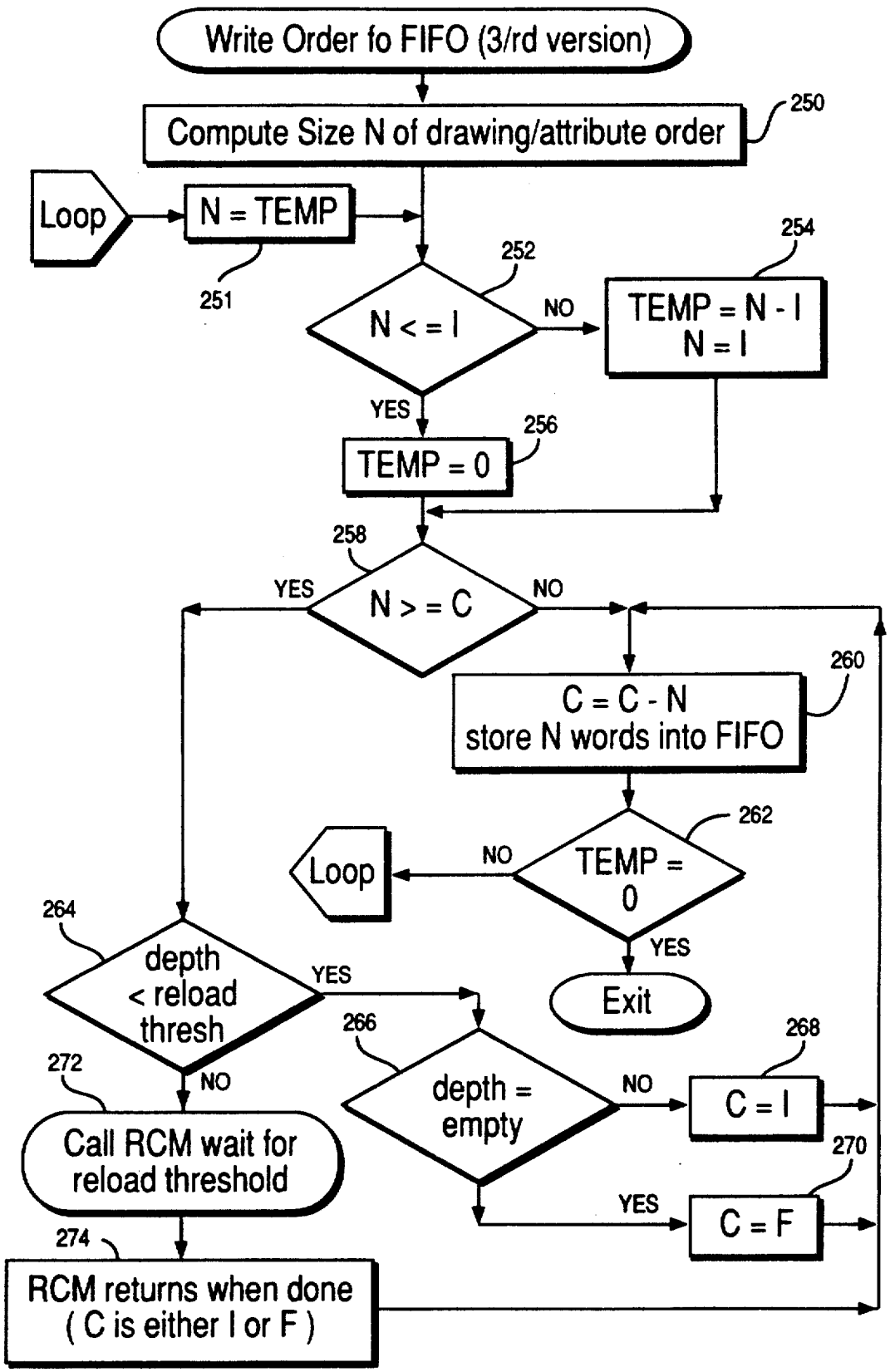
FIG. 10 is a flow chart illustrating a third embodiment of the application process graphics module.

FIG. 10 is a third embodiment of the graphics application command loading module. In step 250, the number of commands N is computed. In step 252, it is determined whether N is less than or equal to I. If not, then in step 254 a temporary count is set that is equal to N-I and then N is set equal to I. The effect of this is to place only I commands at a time into the FIFO. with TEMP holding the unwritten residue each pass. The process then proceeds to step 258.

In step 252, if N is less than or equal to I. the process proceeds to step 256 where the temporary parameter is set to zero. TEMP is set to zero to indicate that no additional looping is required.

Proceeding to step 258, it is determined whether or not N is less than C. If N is less than C then a determination is made as to whether the depth is less than the reload threshold in step 264. If so, then in step 266, it is determined whether the depth is equal to the empty state or whether the buffer is empty. If so, in step 270. C is set equal to F. the total number of commands in the buffer. The process then proceeds to step 260. Returning to step 266, if the depth is not equal to empty, then the process proceeds to step 268 to set C equal to I. The process then proceeds to step 260. Returning to step 264, if the depth is not less than the reload threshold, then the process proceeds to step 272 to call the rendering context manager and entering a wait state waiting for the reload threshold interrupt to be returned. When this interrupt is returned, the process proceeds to step 274 and then proceeds to step 260 where C is then adjusted to C-N and the N words are stored into the command. Then in step 262, it is determined if the temporary count is set to zero. If not, the process returns to step 251, in which N is restored, and thence to step 252 to repeat, since a residue of unwritten commands remain. If the temporary count is zero, the process is exited.

Although the invention has been described with reference to this specific embodiment, this description is not meant to be construed in a limiting sense. Various modifications of the disclosed embodiment, as well as other embodiments of the invention, will become apparent to persons skilled in the art upon reference to the description of this invention. It is, therefore, contemplated that the appended claims will cover any such modifications or embodiments as fall within the true scope of the invention.

We claim:

1. A data processing system, comprising:
   a first processor having a plurality of processes running independently thereon;
   a second processor, including a command buffer queue for receiving a plurality of specialized commands from said first processor, and for executing said commands;
   buffer management means, in said first processor, for controlling the output of said plurality of commands to be executed by said second processor;
   means, included in said buffer management means, for loading a synchronization token into said command buffer queue to indicate to said second processor that a first one of said processes has stopped loading commands into said queue and a second process of said plurality of processes is to start loading commands into said queue; and
   means, included in said second process, for loading said commands from said second process into said buffer queue when said synchronization token is encountered by said second processor.

2. A data processing system according to claim 1 further comprising a plurality of rendering contexts, each associated with a particular one of said plurality of processes.

3. A data processing system according to claim 2 wherein said means for loading a synchronization token comprises means for providing a first one of said rendering contexts associated with said first process, to said second processor, and for replacing said first context with a second one of said rendering contexts, associated with said second process when said synchronization token is encountered by said second processor.

4. A data processing system according to claim 3 further comprising means for loading commands from said second process, and for executing said commands on said second processor in conjunction with said second rendering context.

5. A data processing system according to claim 4, wherein said means for leading a synchronization token is in a wait state subsequent to loading said token and reactivated from said wait state when said token is encountered by said second processor.

6. A data processing system according to claim 5 wherein said plurality of processes are activated only when actually loading commands into said buffer queue.

7. A data processing system according to claim 1 wherein said buffer management means comprises:
   means for counting, in the buffer, an initial number of locations available for storing commands;
   means for computing a number of commands, to be loaded in said buffer queue from one of said plurality of processes for processing by said second processor; and
   means for recounting the number of locations, in the buffer queue, that are available for storing commands based upon the number of commands to be loaded from said one of said plurality of processes.

8. A data processing system according to claim 7 wherein said buffer management means comprises means for determining if the number of commands to be loaded is greater than the recounted number of loadable locations.

9. A data processing system according to claim 8 wherein said means for recounting comprises:
   means for determining from the buffer queue if a threshold number of locations are present, greater than the available recounted locations, by an amount equal to the difference of the number of commands to be loaded and the number of recounted locations; and
   means for altering the recounted number of locations to the threshold number.

10. A data processing system according to claim 9 wherein said means for recounting, comprises:
    means for determining if the recounted number of locations is equal to the maximum capacity of the buffer queue; and
    means for resetting the number of recounted locations to the maximum buffer queue capacity.

11. A data processing system according to claim 10 wherein said means for loading a synchronization token comprises means for continuously loading commands from one of said plurality of processes if the number of commands, determined by the means for computing, exceeds the number of recounted locations.

12. A method for processing commands in a data processing system including first and second processors, a plurality of processes running independently on said first processor, a command buffer queue included in said second processor, said method comprising the steps of:
- receiving, by said command buffer queue, a plurality of specialized commands from said first processor, to be executed by said second processor;
- controlling the output of said plurality of commands, from said first processor;
- loading a synchronization token into said command buffer queue to indicate to said second processor that a first one of said processes has stopped loading commands into said queue and a second process of said plurality of processes is to start loading commands into said queue; and
- loading said commands from said second process into said buffer queue when said synchronization token is encountered by said second processor.

13. A method according to claim 12 further comprising the step of providing a plurality of rendering contexts, each associated with a particular one of said plurality of processes.

14. A method according to claim 13 wherein said step of loading a synchronization token comprises the step of providing a first one of said rendering contexts associated with said first process to said second processor, and for replacing said first context with a second one of said rendering contexts, associated with said second process when said synchronization token is encountered by said second processor.

15. A method according to claim 14 further comprising the steps of loading commands from said second process, and executing said commands on said second processor in conjunction with said second rendering context.

16. A method according to claim 12 wherein said step of regulating, comprises the steps of:
- counting, in the buffer queue, an initial number of locations available for storing commands;
- computing a number of commands to be loaded in said buffer queue from one of said plurality of processes for processing by said second processor; and
- recounting the number of locations, in the buffer queue, that are available for storing commands, based upon the number of commands to be loaded from said one of said plurality of processes.

17. A method according to claim 16 wherein said step of regulating further comprises the step of determining if the number of commands to be loaded is greater than the recounted number of loadable locations.

18. A method according to claim 17 wherein said step of recounting comprises the steps of:
- determining from the buffer queue if a threshold number of locations are present, greater than the available recounted locations, by an amount equal to the difference of the number of commands to be loaded and the number of recounted locations; and
- altering the recounted number of locations to the threshold number.

19. A method according to claim 18 wherein said step of recounting, comprises the steps of:
- determining if the recounted number of locations is equal to the maximum capacity of the buffer queue; and
- resetting the number or recounted locations to the maximum buffer queue capacity.

20. A method according to claim 19 wherein said step of loading a synchronization token comprises the step of continuous loading commands from one of said plurality of processes if the number of commands, determined by the means for computing, exceeds the number of recounted locations.

* * * * *